Patented Nov. 28, 1944

2,363,892

UNITED STATES PATENT OFFICE 2,363,892

GELATIN DERIVATIVES AND PROCESS OF MAKING SAME

Jean Baptiste Monier, Montreal, Quebec, Canada

No Drawing. Application April 7, 1941, Serial No. 387,361. In France March 8, 1937

18 Claims. (Cl. 260—117)

This invention relates to derivatives of gelatin or glue obtained by the interaction of gelatin or glue with a lower fatty acid and relates also to the process of making such derivatives. The present application is a continuation in part of my co-pending application, Serial No. 188,136, filed February 1, 1938.

The primary object of the invention is to produce a product derived from gelatin which has the gelling characteristics of gelatin but which is not hardened by aldehydes, particularly formaldehyde, but is soluble therein.

A further object is to produce new products which are useful as modifying agents for synthetic resins, especially phenol-aldehyde resins.

Various other objects and the advantages of the invention may be ascertained from the following description.

The gelatin-fatty acid products presently of most interest are the acetates. For this reason, and to simplify explanation, the following description is, for the most part, confined to the acetates and the production thereof, but it will be understood that the invention is not confined to the acetates but extends to kindred products such as gelatin formates, propionates and butyrates.

The term "gelatin acetate" or "acetate of gelatin" as herein used is to be understood as a generic term including both the pure acetate and its modifications such as the abieto-acetates, boro-acetates and abieto-boro-acetates; and the same applies to the other fatty acid derivatives of gelatin or glue.

The invention consists broadly in the products obtained by and the process of reacting together gelatin or glue and a lower fatty acid, especially acetic acid, with heating.

In greater detail, the invention consists in the features and combinations of features herein disclosed, together with all such substitutions of equivalents therefor and modifications thereof as are within the scope of the appended claims.

In carrying out the invention, the glue is preferably first hydrolyzed to gelatin or dissolved in a suitable solvent, such as glycerin, or both hydrolyzed and dissolved, and is then caused to react with the acid by heating to at least the boiling temperature of the mixture, which in the case of acetic acid is about 114° C. preferably in the presence of a catalyst.

The glue or gelatin should be carefully selected according to the use to which the product is to be put. For instance, in the production of acetates to be used as modifiers in phenol-formaldehyde resins, gelatins having large jellying power, namely, those with a pH between 4.0 and 5.0 should be avoided for the best results.

The acids used for reaction with the gelatin are preferably pure acids and in the case of acetic acid is the glacial type, at least 99.9% pure.

The pure gelatin-acid products may be modified by incorporation of suitable agents, such as a natural resin, for example, colophony; or an abietate obtained by decomposition of a natural resin with a strong acid; or boracic acid; or both boracic acid and an abietate.

The following examples are illustrative but not limitative, the parts being by weight.

*Example 1.*—Gelatin from animal glue, having a pH of 6.4 is selected and 920 parts of this gelatin is soaked in 4600 parts of water for 24 hours, then 920 parts of glycerin is thoroughly admixed and the whole heated up to 100° C. At that temperature, 600 parts of glacial acetic acid (at least 99.9% pure) is added and the temperature raised to 140° C. and maintained for 2 hours. At the end of this period of time, there is added approximately 7 parts of a catalytic mixture prepared by boiling together under reflux for 30 minutes:

| | Parts |
|---|---|
| 40% hydrochloric acid | 3 |
| Borax | 30 |
| 100% nitric acid | 5 |
| Glycerin | 60 |
| Quinine acetate | 2 |

The heating is continued until a sample taken shows a pH reading between 2.2 and 3.0 at a temperature of 28° C. The mass is then allowed to cool quietly for 24 hours and is then ready for use after being filtered. The product is believed to be a stable tri-acetate of gelatin.

*Example 2.*—An abieto-acetate of gelatin may be prepared by incorporating a natural resin, such as colophony, in the mixture of Example 1. The method now preferred is to admix 5 parts of natural resin, for instance colophony, and 6 parts of glacial acetic acid to the product of Example 1 and heat the mixture to boiling for 2 hours. There is then added about 9.2 parts of the catalytic mixture of Example 1 and the whole is heated for 10 minutes at 160° C.

*Example 3.*—A boro-acetate of gelatin is prepared by adding 2.5 parts of boracic acid crystals to the mixture of Example 1, during the reaction.

*Example 4.*—An abieto-boro-acetate is prepared by proceeding as in Example 2 and adding to the reaction 5 parts of boracic acid.

*Example 5.*—The process of Example 3 is followed and during the reaction, 1 part of hexamethylenetetramine is added.

Gelatin reaction products with other lower fatty acids, such as formic, propionic and butyric acids, may be made according to the teaching of the foregoing examples.

When making such other products, it is desirable that the quinine acetate of the catalyst mixture be replaced by a formate, propionate or butyrate, according to the acid used to react with the gelatin, so as to avoid the presence of mixed acid radicals in the product.

Catalytic agents other than that described may be used with good results. The hydrochloric acid may be replaced by a smaller amount of sulphuric acid or by hydrogen peroxide or by hydrogen chloride blown into the reaction. The nitric acid may be replaced by a derivative or by substances such as calcium hypochlorite. The borax may be omitted or replaced by borates. It is now believed that the significant constituent of the catalyst is a substance derived from an aromatic base such as pyridine, quinoline, isoquinoline or a vegetable alkaloid. Instead of quinine acetate, there may be used the anhydrous alkaloid or the hydrobromide or salicylicate or synthetics such as 8-diethylamino-isopentylamino-6-methoxy-quinoline-dihydrochloride or 2-chloro-5-diethylamino-isopentylamino-7-methoxy - acridine - dihydrochloride.

Instead of glycerin as solvent for the gelatin, there may be used various of the di-, tri- and poly-hydric alcohols and derivatives thereof, for example, ethylene glycol, triethylene glycol and substances such as ethylene choride and ethylene diamine.

Having thus described my invention, I claim:

1. A formaldehyde soluble reaction product of gelatin and a lower fatty acid.
2. A formaldehyde soluble reaction product of gelatin and glacial acetic acid.
3. Gelatin acetate prepared from gelatin having a pH outside the range 4.0 to 5.0.
4. Gelatin acetate having a pH between 2.2 and 3.0 at 28° centigrade.
5. A formaldehyde soluble gelatin acetate.
6. The process of making gelatin derivatives which comprises reacting together gelatin and a lower fatty acid with heating.
7. The process of making gelatin acetate which comprises reacting together gelatin and glacial acetic acid with heating.
8. The process of making gelatin acetate which comprises reacting together gelatin dissolved in glycerin and glacial acetic acid with heating.
9. The process of making gelatin acetate which comprises reacting together water swelled gelatin dissolved in glycerin and glacial acetic acid with heating and in the presence of an acidic catalyst including a derivative of an aromatic base.
10. The process of making a gelatin derivative which comprises reacting together a lower fatty acid and gelatin in solution in a non-aqueous solvent, with heating and in presence of an acidic catalyst including a derivative of a substance selected from the group consisting of pyridine, quinoline, isoquinoline and vegetable alkaloids.
11. The process of making gelatin derivatives which comprises reacting together glacial acetic acid and water-swelled gelatin dissolved in glycerin, with heating and in presence of an acidic catalyst including a derivative of a substance selected from the group consisting of pyridine, quinoline, isoquinoline and vegetable alkaloids.
12. The process of making gelatin derivatives which comprises reacting together gelatin and a lower fatty acid with heating and in the presence of an acidic catalyst including a derivative of an aromatic base.
13. The process of making gelatin derivatives which comprises reacting together gelatin and glacial acetic acid with heating and in the presence of an acidic catalyst including a derivative of an aromatic base.
14. A formaldehyde-soluble reaction product of approximately three parts by weight of gelatin and two parts by weight of glacial acetic acid.
15. The process of making gelatin derivatives which comprises reacting together with heating, gelatin and glacial acetic acid and an agent selected from the group consisting of natural resins and alkaline abietates of natural resins.
16. The grocess of making gelatin derivatives which comprises reacting together with heating, gelatin and glacial acetic acid and boracic acid.
17. A formaldehyde-soluble reaction product of gelatin, glacial acetic acid, and an agent selected from the group consisting of natural resins and alkaline abietates of natural resins.
18. A formaldehyde-soluble reaction product of gelatin, glacial acetic acid, and boracic acid.

JEAN BAPTISTE MONIER.